May 4, 1937.                G. LYNCH                2,079,259
                       WEIGHING MECHANISM
                       Filed Sept. 21, 1931          2 Sheets-Sheet 1
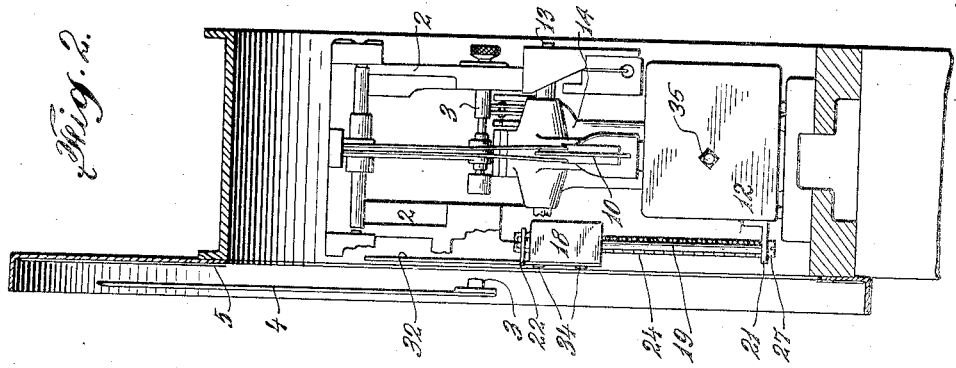
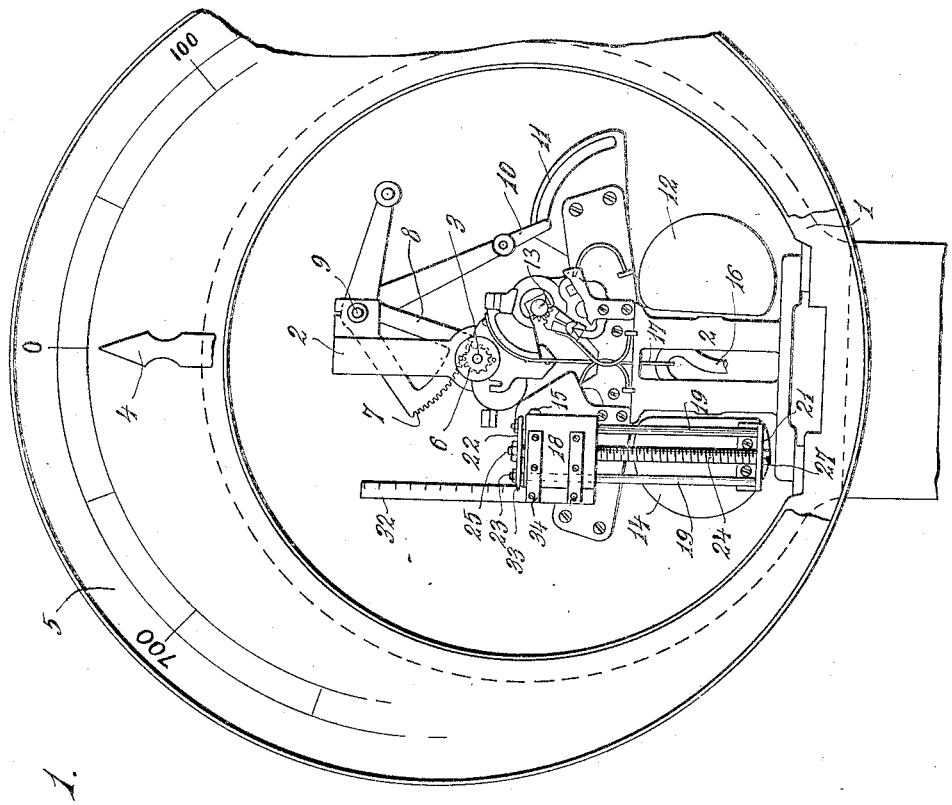
INVENTOR-
George Lynch
BY
P. P. Bourne
ATTORNEY- May 4, 1937.  G. LYNCH  2,079,259
WEIGHING MECHANISM
Filed Sept. 21, 1931  2 Sheets-Sheet 2
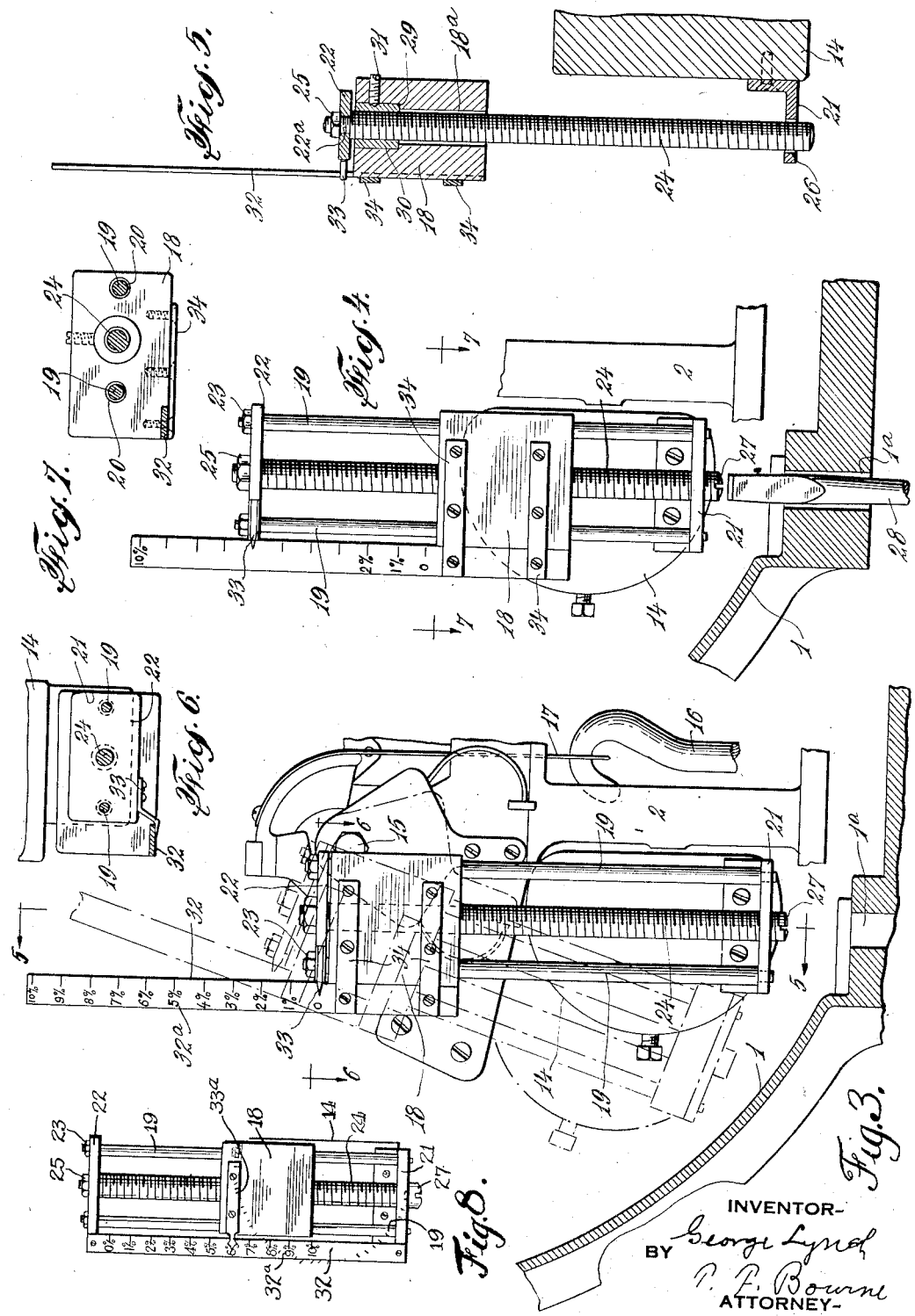
INVENTOR
George Lynch
BY P. F. Bourne
ATTORNEY Patented May 4, 1937

2,079,259

UNITED STATES PATENT OFFICE 2,079,259

WEIGHING MECHANISM

George Lynch, New York, N. Y., assignor, by mesne assignments, to The Kron Company, Bridgeport, Conn., a corporation of Connecticut Application September 21, 1931, Serial No. 564,073

19 Claims. (Cl. 265—36)

In weighing various materials and commodities containing moisture or water, such as sand and gravel, it has been the practice to ascertain the percentage of the moisture or water therein, and after the material or commodity has been weighed, including the weight of the moisture or water content, to calculate by said percentage the net weight of the material or commodity exclusive of its known percentage of moisture or water content.

An object of my invention is to provide a weighing mechanism or scale with means adapted to be adjusted to a position relatively to the weighing devices in such a way as to compensate for extraneous material in articles or loads being weighed, such as the moisture or water content, or to compensate for changes in specific gravity, of such articles or loads, whereby when said means has been adjusted to compensate for a known percentage of moisture content, or for a known change in specific gravity of the article or load, the true net weight of such article or load exclusive of its known percentage of extraneous material will be shown by the scale indicator without requiring any calculations to be made.

This automatic percentage compensating performance of a weighing scale will be recognized as a function which can not be performed in the weighing of loads of different magnitude by any of the well known weighing devices adapted to compensate for tare. Tare, as represented in the weight of a container for holding salable goods when they are being weighed, is a constant number of pounds whatever may be the varying magnitudes or gross weights of the different loads successively to be weighed. That portion of salable goods, however, which is represented by a known percentage of useless and unsalable material such as water or moisture content, is a constant percentage of the varying gross weight of the different loads to be weighed, and therefore is not a constant number of pounds in the case of such different loads.

In the example of my invention illustrated in the accompanying drawings I attach to a weighted arm or pendulum in a scale mechanism a compensating device comprising an adjustable compensating weight, a scale of graduations which may be marked to designate percentage, and a pointer, all so related to said arm or pendulum that the said compensating weight may be adjusted to various positions relatively to the weighing arm or pendulum according to, and to compensate for, a predetermined or ascertained percentage of moisture or water content that is common to loads of different gross magnitude to be weighed, whereby when said loads are weighed the true gross weight may be shown by the scale mechanism dial or indicator, or with a suitable setting of the compensating weight, a net weight equal to the gross weight minus the percentage of water or moisture content may be shown.

My invention also comprises novel details of improvement that will be more fully hereinafter set forth and then pointed out in the claims.

Reference is to be had to the accompanying drawings, wherein:

Fig. 1 is a front view of the top or dial head portion of a weighing scale incorporating mechanism embodying one form of my invention.

Fig. 2 is a side elevation of the dial head mechanism looking from the right at Fig. 1 and showing portions of the housing in section on a central vertical plane.

Fig. 3 is an enlarged view of parts of the mechanism shown in Fig. 1.

Fig. 4 is similar to a portion of Fig. 3 showing the compensating weight adjusted to a different position relative to the weighing arm or pendulum.

Fig. 5 is a view taken in section on the plane 5—5 in Fig. 3 looking in the direction of the arrows.

Fig. 6 is a fragmentary view showing certain parts in section on the plane 6—6 in Fig. 3 looking in the direction of the arrows.

Fig. 7 is a fragmentary view taken in section on the plane 7—7 in Fig. 4 looking in the direction of the arrows.

Fig. 8 shows a modified form of certain parts appearing in Fig. 3.

Similar numerals indicate corresponding parts in the several views.

I have illustrated my improvement in connection with a well known type of weighing scale mechanism comprising a frame 1 having uprights 2 in which is journaled a shaft 3 carrying a dial pointer 4 adapted to sweep over a dial 5 to indicate the weight of articles or loads being weighed. Shaft 3 has a gear 6 in mesh with a curved rack 7 carried by arms such as 8 pivoted at 9, arm 8 swinging in unison with a projecting member 10 co-operative with a cam 11 carried by a weighing arm or pendulum including the weight block 12 and pivotally supported by the uprights 2 at 13. Another weighing arm or pendulum including weight block 14 is similarly supported by the uprights 2, at 15. Each weight block of the weighing arms carries a set screw 35 to hold the block at adjustable radial distances from pivots 13 or 15 in a well known manner. See, for instance, United States Patent Number 1,797,441 granted March 24, 1931 to E. J. Ohnell. A draft rod 16 (which may be connected with the scale platform in a known way, not shown), is connected with the weighing arms or pendulums, respectively, by steel strips 17 one of which is shown in Fig. 1 and the other in Fig. 3. When an article or load is placed on the platform (not shown) the draft rod 16 will be pulled to cause the weighing arms 12 and 14 to swing outwardly appropriately to cause the rack 7 and gear 6 to rotate the dial pointer 4 to indicate the weight of the article or load on the dial 5 in a well known way.

It is the well known practice in this type of scale mechanism to so arrange the above described connections between dial pointer 4 and the pendulum weights 14 and/or 16 in conjunction with the load of the weighing platform or other means for holding the loads to be weighed, that the dial pointer shall "balance", or be free to oscillate slightly to both sides of the zero graduation on the dial 5 when the said pendulum weights are slightly displaced from abutting contact with the frame uprights 3 or any other positive stop therefor, this being the preferred condition of parts in zero position, in the absence of a weighable load.

Upon one of the weighing arms or pendulums, such as upon the weight block of pendulum 14, I apply my improvement to compensate for the percentage of moisture content or specific gravity in an article to be weighed. The devices I have illustrated may be described as follows. A compensating weight 18 is adjustably supported on arm 14, said arm being shown provided with spaced guide rods 19 entering vertical holes 20 in the compensating weight 18, whereby the latter is guided slidably along said rods. A bracket 21 is shown secured to the arm 14 and the lower ends of the rods 19 are secured to said bracket, as by riveting. The upper ends of the rods 19 are shown braced by a plate or bar 22, to which the rods are secured, as by shoulders on the rods and nuts 23 screwed on the rods, between which shoulders and nuts the bar or plate is clamped. The rods 19 are spaced from the weight block of arm 14 for the passage therealong of the compensating weight 18, and said rods extend in a vertical direction when the arm 14 is at rest in the zero position, as illustrated in Figs. 1, 3 and 4. To adjust the weight 18 and retain it in set position I provide a screw threaded rod 24, shown located between the rods 19 and journaled at its upper end on the bar or plate 22 by means of the reduced portion 22a retained by nut 25 on the threaded end, (Fig. 5). The lower end of screw rod 24 is located in a guide opening 26 in the bracket 21, said lower end being shown provided with a slot 27 to receive a tool 28 adapted to be entered through a hole 1a in frame 1, (Fig. 4), for rotating rod 24. The weight 18 is shown provided with a bore 18a through which the rod 24 extends. A sleeve 29 is shown in the bore 18a of weight 18 and is provided with a bore having threads 30, the sleeve being retained by a set screw 31, for convenience of manufacture, (Fig. 5). The rod 24 extends through sleeve 29 in mesh with the threads 30, whereby the weight is adjustably supported by the rod 24. Said rod 24 extends in a vertical direction, parallel to the rods 19, when arm 14 hangs in the zero position. By rotating the rod 24 the weight 18 may be adjusted up or down as desired. The rod operates in cooperation with a graduated scale and pointer to determine the required position of the compensating weight according to the percentage of moisture or water content known to be present in an article or known to be common to different loads being weighed. I have indicated a graduated scale 32 carried by and projecting from the weight 18 and a pointer 33 supported on arm 14, being shown secured to bar 22, to point to percentage or other arbitrary indications 32a on the scale. The scale 32 may be a strip of suitable metal attached to bars 34 secured to the weight 18 as by screws.

The counterbalancing action of the arm 14 with the compensating devices attached thereto may be substantially the same as that of the arm 12 with its attached devices, so that the weighing scale or mechanism may be sealed when both of said arms hang with the pointer 4 at zero, and with the weight 18 elevated so that the pointer 33 points to zero on the scale 32, as in Figs. 1 and 2. With the weight 18 in the elevated position described ordinary weighing may be carried out in the usual way. In case an article or loads are to be weighed, such as sand, gravel, stone or the like, containing extraneous material, such as a moisture or water content, the percentage of such content which is common to different loads first will be ascertained in a known way and the weight 18 will be adjusted downwardly with respect to the horizontal level of the pivot 15 of arm 14 until the percentage of said content marked on the scale 32 registers with the pointer 33, as in Fig. 4. The lowered position from zero on scale 32 of the weight 18 has the effect to increase the resistance to the swinging of arm 14 away from zero position in the weighing operation in proportion to the percentage of moisture content in the article or load being weighed, whereby compensation for the percentage of weight of the said content is provided for, with the result that the pointer 4 will point on scale 5 to the indication thereon of the true net weight of the article or load exclusive of the weight of the moisture content. It is merely necessary to set the weight 18 at any desired position between zero and the highest percentage indication on scale 32 to compensate for a known percentage of moisture or water content in an article or load being weighed, since the lower the weight 18 is adjusted along arm 14 from the zero position on scale 32 the greater will be the percentage of moisture in the article or load compensated for in the weight indicated by dial pointer 4. Conversely, it will be recognized that the higher the weight 18 be adjusted, the less the percentage of moisture or other special material will be compensated for in the weight indication. Thus if the parts 19 and 24 be made long enough the weight 18 may be raised to well above the horizontal level of the pivot 15 in which event its effect upon the indicating performance of dial pointer 4 would be to cause such pointer to indicate a weight equal to more than 100% of the gross weight of the actual load being weighed. My invention is particularly useful in weighing such articles as wet sand, gravel, stone and the like to quickly arrive at the correct specifications in weighing aggregates for concrete.

It will be understood that the raising and lowering adjustments of the weight 18 are arranged to take place in a substantially vertical direction when the pendulum weights 14 and/or 12, in the absence of a weighable load, are hanging in the positions indicated by full lines in Figs. 1, 3 and 4, with the dial pointer "balanced" at zero. Obviously then, the above said vertical adjustment of weight 18 shifts the position of the combined structure which includes the weight 18 and/or indicators 32, 33 relative to the rest of the pendulum parts without setting up any change of torque or moment tending to swing the pendulum about its pivot 15.

This results from the fact that while vertical shifting of weight 18 actually changes the position of the center of gravity of the entire pendulum structure and therefore varies the radial distance from such center of gravity to the pendulum pivot 15, the vertical shifting of weight 18 does not vary the horizontal lever arm representing the effective distance from the pivot 15 at which gravity pulls downwardly on said center of gravity, and therefore in the zero position of parts described no disturbance or change in the balance of the pendulum is occasioned by changes in position of the weight 18, whereas change in the balancing resistance to weighable loads will come into effect as the pendulum swings upwardly about its pivot 15 with the position of its center of gravity thus altered.

My invention is simple and effective for the purposes specified, and has the advantage that weighing may be carried out quickly and accurately without requiring calculations to be made as to the weight of moisture content in the article weighed according to the ordinary weighing of wet articles.

Changes may be made in the details of construction set forth without departing from the scope of the appended claims, as, for instance, the scale 32a may be attached to the arm 14 and the pointer 33a may be attached to the weight 18 to cooperate with said scale in different positions of the compensating weight, (see Fig. 8). My improved compensating devices are not limited to use in the particular construction of weighing mechanism set forth since said devices may be embodied in other constructions of weighing mechanisms or scales.

Having now described by invention what is claimed is:

1. A weighing mechanism having a depending weighing arm, a weight indicating device operative by said arm, a vertical rod carried by said arm, a weight movably guided by said rod, and means to retain said weight in different positions along the rod to vary the resistance of the arm for weighing, to indicate on the weight indicating device the weight of the article minus extraneous material therein.

2. A weighing mechanism according to claim 1 in which the weight retaining means includes a threaded rod carried by the arm and cooperative with the weight for moving the latter to a set position along the arm.

3. A weighing mechanism having a weighing arm for normal weighing, a weight movably carried by the arm to be set in different positions therealong to vary the resistance of the arm for weighing, a scale carried by the weight, and a pointer carried by the arm to cooperate with the scale for indicating positions of the weight along the arm according to percentage of extraneous material in an article to be weighed.

4. A weighing mechanism having a depending weighing arm, a weight indicating device operative by said arm, a bracket secured to the arm, a rod carried by the bracket and extending along the arm, a weight guided by said rod, and means to retain the weight in different positions along the arm to vary the resistance of the arm for weighing, said means to retain the weight including a threaded rod carried by the arm and co-operative with the weight for adjusting the latter to different positions along the arm.

5. A weighing mechanism having a weighing arm, a bracket secured to the arm, a rod carried by the bracket and extending along the arm, a weight guided by said rod, and means to retain the weight in different positions along the arm, the weight and the arm being provided with a cooperative scale and pointer to indicate desired positions of the weight along the arm according to the percentage of extraneous material in an article to be weighed.

6. A weighing mechanism having a weighing arm, a bracket carried by the arm, spaced rods carried by the bracket, and extending vertically when the arm is in zero position, a bar secured to the upper parts of said rods, a threaded rod journaled on said bar, a weight guided by said rods and having threads cooperative with said threaded rod, and a scale and a pointer carried by the weight and the rod for indicating desired positions of the weight along the arm.

7. A weighing mechanism comprising a pivoted weighing arm, a dial, a pointer for the dial, means cooperative between said arm and pointer for operating the pointer relatively to the dial to indicate weight of a load, a weight carried by the arm and movable to different positions below its pivot, and means to retain said weight in different positions along the arm according to desired compensation for extraneous material in loads to be weighed, thereby to indicate on the dial the weight of a load minus said extraneous material, together with indicating means supplemental to said dial and pointer including a scale of graduations carried by said weight and a cooperative pointer carried by the arm.

8. A weighing mechanism comprising in combination, a pivoted pendulum connected to counter-balance a portion of the total magnitude of a load being weighed, a weight indicator connected to be operated by said pendulum, a second pendulum supported separately from the first pendulum and connected to counter-balance an additional portion of the total magnitude of said load, and a supplemental weight carried by the second pendulum and adjustable thereon to vary the position of the center of gravity of the combined weight and second pendulum structure, whereby said pivoted pendulum is relieved of the burden of supporting said supplemental weight while influenced in its action thereby.

9. A weighing mechanism including in combination, a pendulum pivoted for normal swinging movement to accord with different magnitudes of weighable loads, a weight indicator, a cam and follower connection arranged to transmit a variable ratio of movement from the pendulum to the indicator, said cam being formed to produce equal and normal increments of indicator movement responsive to respectively equal variations of load magnitude, adjustable devices for selectively supplying different supplemental weight forces to said pendulum thereby to modify the normal swinging movement of the pendulum and the normal response of the indicator to variations in load magnitude so that the modified movements of the indicator will accord with known percentages of extraneous material in the loads being weighed as determined by pre-selected adjustment of said devices.

10. A weighing mechanism having a pivoted weighing arm, weight indicating devices operative by said arm, a weight carried by the arm below the pivot to guide the weight therealong, means to retain said weight in different positions along the arm to vary the resistance of said arm for weighing, and percentage indicating means to gauge selectively the position of the weight relative to the arm in accordance with a known percentage of special content that is common to loads of different magnitude to be weighed.

11. A pivoted weighing mechanism comprising a weighing arm, a dial, a pointer for the dial, means co-operative between said arm and pointer for operating the one relatively to the other to indicate weight of a load, a weight carried by the arm and movable to different positions below its pivot, and means to retain said weight in different positions along the arm according to desired compensation for a selected percentage of special content that is common to loads of different magnitude to be weighed to indicate on the dial the weight of the said loads minus said content.

12. A weighing mechanism according to claim 11, in which the indicating means includes a series of graduation marks carried by the arm and disposed in angular relation to all radial lines which pass through the pivot of said arm and the center of gravity of said arm, and a pointer carried by the weight.

13. A weighing mechanism having a pivoted weighing arm, a weight, means carried by the arm to guide the weight therealong, means to retain said weight in different positions along the arm, and indicating means to indicate the position of the weight relative to the arm, said weight retaining means including a threaded rod disposed at an angle to all radial lines which pass through the pivot of the arm and the center of gravity of the arm and co-operative with the weight for moving the latter along the arm.

14. A scale mechanism adapted automatically to compensate for a selectively determined percentage of extraneous content that is common to loads of different magnitude to be weighed, including in combination, a pendulum arranged to swing for effecting a balance of the true weights of said loads, a weight carried by and operative with said pendulum, means to retain said weight in different positions relative to the pendulum to determine the balancing resistance of said pendulum in a way to compensate for said percentage of extraneous content that is common to said loads, and means co-operative with said weight to gauge its position in accordance with different percentage values corresponding respectively with the known values of the percentages of said extraneous content, said pendulum being operable to swing for balancing a load to be weighed in all positions of the said weight relative to the pendulum.

15. A scale mechanism adapted automatically to compensate for a selectively determined percentage of extraneous content common to loads of different magnitude to be weighed, including in combination, a pivoted pendulum arm arranged to swing for effecting a balance of the true weights of said loads, a weight carried by the pendulum arm, means to guide the weight along said pendulum arm below the pivot thereof, means to retain said weight in different positions in relation to the pendulum arm to vary the balancing resistance thereof in a way to compensate for the known percentage of extraneous content common to said loads, and means co-operative with said weight to gauge its percentage determining position in relation to the pendulum arm.

16. In a weighing mechanism, a load balancing pendulum, a pivot on which said pendulum swings, means normally operative to balance said pendulum in zero position in the absence of a weighable load, in which position the center of gravity of said pendulum is substantially out of vertical alignment with said pivot, and means adapted to vary the distance from the said center of gravity to the said pivot when the pendulum is balanced in zero position without thereby varying the horizontal distance from said pivot to the line of pull of gravity upon said center of gravity.

17. In a weighing mechanism, a load balancing pendulum, a pivot on which said pendulum swings, means normally to balance said pendulum in zero position in the absence of a weighable load in which position the center of gravity of said pendulum is substantially out of vertical alignment with said pivot, and a supplemental compensating weight carried by said pendulum in a manner to be adjustable in a substantially vertical direction when said pendulum is balanced at zero position, whereby vertical adjustment of said weight causes no displacement of said pendulum from its zero position in the absence of a weighable load.

18. In a weighing mechanism, a load balancing pendulum, a pivot on which said pendulum swings, means normally operative to balance said pendulum in zero position in the absence of a weighable load, and a supplemental compensating weight carried by said pendulum in a manner to be adjustable in a substantially vertical line of direction substantially displaced from alignment with said pivot when said pendulum is in its zero position.

19. A load weighing mechanism comprising a pivoted weighing arm, a dial having graduations marked to designate units of weight, a pointer movable over the dial graduations, connections between the arm and pointer for moving the pointer to indicate on said graduations the weight of a load, a weight adjustable to different positions on the arm below the pivot thereof, said positions being marked to designate percentages of extraneous material in loads to be weighed thereby to indicate the effect upon the movement of said pointer resulting from adjustment of said weight.

GEORGE LYNCH.